United States Patent
Nozaki

(10) Patent No.: US 7,046,290 B2
(45) Date of Patent: May 16, 2006

(54) MULTI-POINT AUTO-FOCUS DIGITAL CAMERA INCLUDING ELECTRONIC ZOOM

(75) Inventor: Hirotake Nozaki, Kouto-ku (JP)

(73) Assignee: Nikon Corporation, Tokyo (JP)

( * ) Notice: Subject to any disclaimer, the term of this patent is extended or adjusted under 35 U.S.C. 154(b) by 659 days.

(21) Appl. No.: 09/767,863

(22) Filed: Jan. 24, 2001

(65) Prior Publication Data

US 2001/0022626 A1    Sep. 20, 2001

(30) Foreign Application Priority Data

Jan. 26, 2000  (JP)  ............................. 2000-017642
Jan. 26, 2000  (JP)  ............................. 2000-017647

(51) Int. Cl.
 H04N 5/232   (2006.01)
 H04N 5/262   (2006.01)
 G03B 13/00   (2006.01)
 G03B 13/34   (2006.01)
 G03B 3/10    (2006.01)

(52) U.S. Cl. .................. 348/350; 348/240.1; 396/121
(58) Field of Classification Search ............... 348/341, 348/345, 346, 347, 348, 349, 350, 351, 352, 348/353, 354, 355, 356, 357, 240.97, 240.1, 348/240.2, 240.3, 353.03, 240.99; 396/121, 396/122, 123, 124
See application file for complete search history.

(56) References Cited

U.S. PATENT DOCUMENTS

| | | | | |
|---|---|---|---|---|
| 4,873,576 A | * | 10/1989 | Hattori et al. | 348/333.02 |
| 5,258,799 A | * | 11/1993 | Tanii et al. | 396/60 |
| 5,264,889 A | * | 11/1993 | Ishida et al. | 396/50 |
| 5,307,111 A | * | 4/1994 | Kurei | 396/123 |
| 5,365,302 A | * | 11/1994 | Kodama | 396/51 |
| 5,581,323 A | * | 12/1996 | Suzuki et al. | 396/51 |
| 5,699,115 A | * | 12/1997 | Hiraki et al. | 348/333.13 |
| 5,838,370 A | * | 11/1998 | Kaji | 348/240.2 |
| 5,861,917 A | * | 1/1999 | Tariki et al. | 348/230.1 |
| 6,091,450 A | * | 7/2000 | Hirasawa | 348/333.01 |
| 6,144,804 A | * | 11/2000 | Inoue | 396/51 |
| 6,192,198 B1 | * | 2/2001 | Kitani et al. | 396/50 |
| 6,359,650 B1 | * | 3/2002 | Murakami | 348/333.04 |
| 6,522,360 B1 | * | 2/2003 | Miyawaki et al. | 348/347 |
| 6,633,336 B1 | * | 10/2003 | Toyoizumi et al. | 348/333.02 |
| 6,670,992 B1 | * | 12/2003 | Irie | 348/350 |

FOREIGN PATENT DOCUMENTS

JP    05019158 A  *  1/1993
JP    06094976 A  *  4/1994

* cited by examiner

Primary Examiner—Ngoc-Yen Vu
Assistant Examiner—Justin Misleh
(74) Attorney, Agent, or Firm—Oliff & Berridge, PLC

(57) ABSTRACT

A camera for recording an image captured using image-capturing element in a recording medium is provided with a focal point detection device for detecting a focal point adjustment state of a photographic lens in each focal point detection region of a plurality of focal point detection regions set inside an photographic field. When electronic zoom shooting is carried out, part of an imaged picture is trimmed and an image for recording in the recording medium is created. For a plurality of focal point detection regions the focal point detection regions are changed according to the trimming range of the imaged picture. Focal point adjustment of the photographic lens is carried out based on focal point detection results for focal point detection regions that have been changed.

10 Claims, 13 Drawing Sheets

MULTI-POINT AUTO-FOCUS DIGITAL CAMERA INCLUDING ELECTRONIC ZOOM

BACKGROUND OF THE INVENTION

1. Field of the Invention

The present invention relates to a camera that performs focal point detection in a plurality of focal point detection regions within a photographic field.

2. Description of the Related Art

A camera (related art 1) being set a plurality of focal point detection regions within a photographic field, that is provided with a focal point detection device for detecting a focal point adjustment state of a photographic lens in each of the focal point detection regions, is known.

A camera (related art 2) provided with an electronic zoom shooting mode, a pseudo wide shooting mode, and a pseudo panorama shooting mode is also known. In the electronic zoom shooting mode, central parts of an imaged picture are cut out and enlarged so that a pseudo zoomed up image that is substantially the same as a zoomed-up image taken using a zoom lens is generated. In the pseudo wide shooting mode and the pseudo panorama shooting mode, an upper part and a lower part of the imaged picture are removed and central wide range sections are enlarged so that a pseudo wide image and a pseudo panorama image that are the same as wide image and panorama image taken using a wide angled lens are generated.

There is also known a miniaturized digital still camera (related art 3) that can take a photograph while viewing a subject image on a liquid crystal monitor screen, and that can take a photograph while looking at a subject image in an optical viewfinder.

However, in the electronic still camera of related art 2, for carrying out focal point detection in a plurality of focal point detection regions within a photographic field, if an electronic zoom photography or a pseudo wide/pseudo panorama photography that trims a part of an imaged picture are carried out, the focal point detection regions may be placed outside the trimming range. In particular, if the trimming range becomes narrow, a lot of the focal point detection regions will be outside the trimming range. For this reason, if the photographer inadvertently selects a focal point detection region that is no longer inside the trimming range, there is a problem that an image focused on the intended subject inside the trimming range is no longer obtained.

It has been considered to mount a focal point detection device having a plurality of focal point detection regions in the comparatively small-sized electronic still camera of the related art 3, to improve focussing performance with respect to the main subject by carrying out focal point detection at a plurality of regions inside the photographic field.

Display of a plurality of focal point detection region marks on a liquid crystal monitor screen can be realized at low cost and without taking up any installation space. However, to display a plurality of focal point detection region marks inside an optical viewfinder requires high cost and a large installation space. This means that the requirements of the miniature electronic still camera of related art 3 with respect to miniaturization and cost reduction are not satisfied.

SUMMARY OF THE INVENTION

A first object of the present invention is to adjust a focal point making effective use of a plurality of focal point detection regions set inside a photographic field, even in a shooting mode for trimming part of an imaged picture to create a recorded image.

A second object of the present invention is to provide an electronic still camera capable of focal point detection in a plurality of regions inside a photographic field while maintaining a small size and low cost.

In the present invention, the above described first object is achieved by a camera, for recording an imaged picture using image-capturing elements in a recording medium, comprising a focal point detection device for detecting a focal point adjustment state of a photographic lens in each focal point detection region of a plurality of focal point detection regions set inside a photographic field, a picture trimming section for trimming part of an imaged picture to create an image to be recorded in the recording medium, a region changing section for changing focal point detection regions in response to a trimming range of the imaged picture, and a focal point adjustment device for carrying out focal point adjustment for the photographic lens based on focal point detection results for the focal point detection regions that have been changed.

With the region changing section, the focal point detection region corresponding to a trimming range of the imaged picture can be selected. It is also possible to change the position of the focal point detection region corresponding to the trimming range of the imaged picture. Alternatively, it is possible to change the size of the focal point detection region corresponding to the trimming range of the imaged picture.

The image trimming section can trim central portions of the imaged picture to enlarge the image and create an electronically zoomed image. Further, the image trimming section can remove upper and lower parts of the imaged picture and trim central broad portions to create a pseudo wide image or a pseudo panorama image.

When a manual region selection focal point adjustment mode, selecting an arbitrary focal point detection region among the plurality of focal point detection regions, that carries out focal point adjustment is set, it is possible to issue a warning when a focal point detection region that can not be selected, because it is outside the trimming range, has been selected.

The camera of the present invention can also use silver halide film as the recording medium.

The camera of the present invention has a focal point detection device for detecting a focal point adjustment state of a photographic lens in each focal point detection region of a plurality of focal point detection regions set inside a photographic field, an optical viewfinder, and a monitor for displaying the position of each of the focal point detection regions superimposed on a subject imaged using image-capturing elements. Then, the above described second object is achieved by further providing a region selection member for manually selecting an arbitrary focal point selection region among the plurality of focal point detection regions, a focal point adjustment device for operating in a manual region selection focal point adjustment mode for performing focal point adjustment of a photographic lens, based on focal point detection results for a focal point selection region manually selected by the region selection member, a sensing section for sensing a non-used state of the monitor, and a prohibiting member for prohibiting manual selection of a focal point detection region by the region selection member when a non-used state of the monitor is sensed. It is also possible to achieve the above described second object by providing a sensing section for sensing that photography has been performed using an optical viewfinder, and a prohibiting member for prohibiting manual selection of a focal point detection region using the region selection member if photography using the optical viewfinder is sensed.

As well as the manual region selection focal point adjustment mode, the focal point adjustment device can also be used operating in an automatic region selection focal point adjustment mode for carrying out focal point adjustment by automatically selecting any focal point detection region among a plurality of focal point detection regions, and a central fixed focal point adjustment mode for performing focal point adjustment using focal point detection results for focal point detection regions in the center of an imaged picture. In this case, when the sensing section senses a non-used state of the monitor, or when photography using the optical viewfinder is sensed, selection of the manual region selection focal point adjustment mode is prohibited. It is preferable to provide a mode switching section for switching the automatic region selection focal point adjustment mode to the central fixed focal point adjustment mode when a non-used state of the monitor is sensed or when photography using the optical viewfinder is sensed, while the automatic region selection focal point adjustment mode is being selected.

It is preferable to issue a warning in the event that the region selection member is operated when manual selection of a focal point detection region is being prohibited. When the monitor is being turned off, it is possible to decide that photography is carried out using the optical viewfinder. It is also possible to decide that photography has been carried out using the optical viewfinder as a result of sensing that the photographer is looking through the eyepiece of the optical viewfinder.

DESCRIPTION OF THE PREFERRED EMBODIMENTS

First Embodiment

Figure 1:
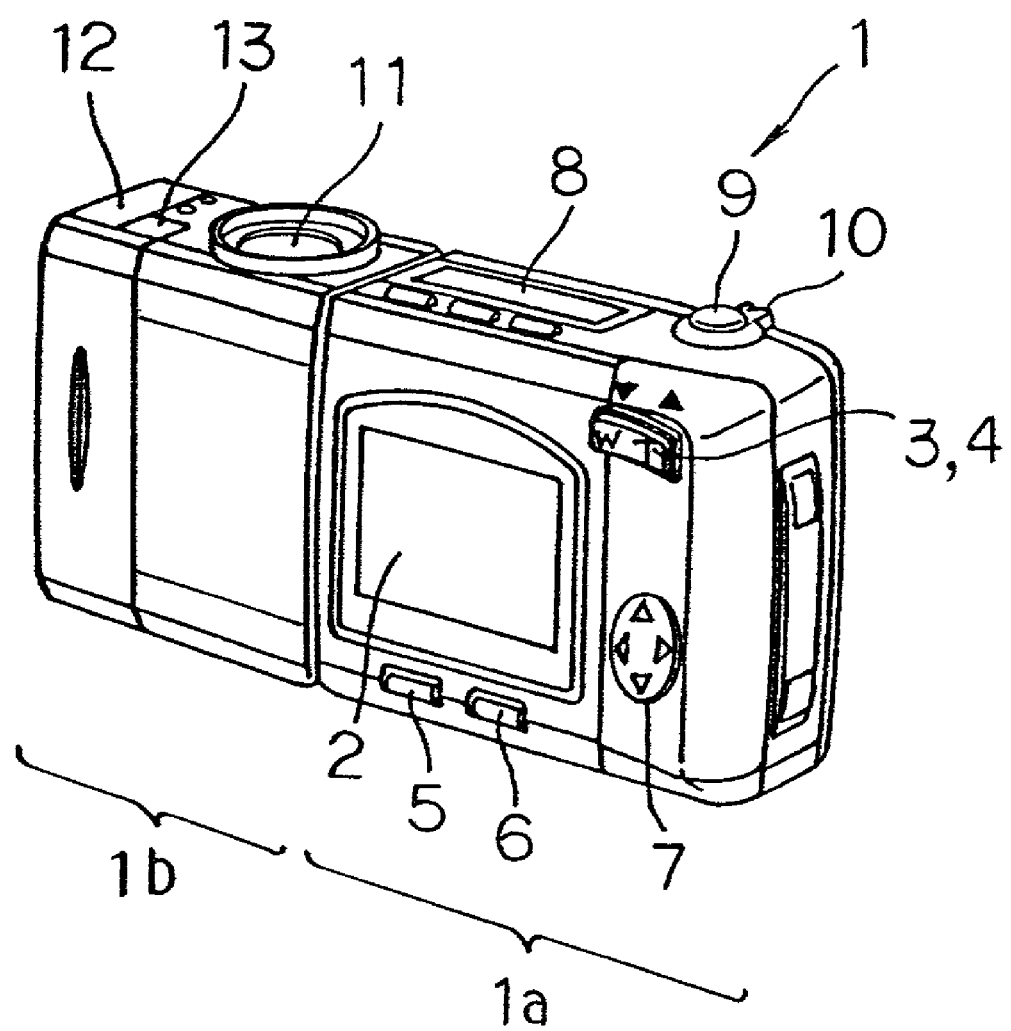
FIG. 1 is a rear exterior view of a camera of an embodiment when not in use.
Figure 2:
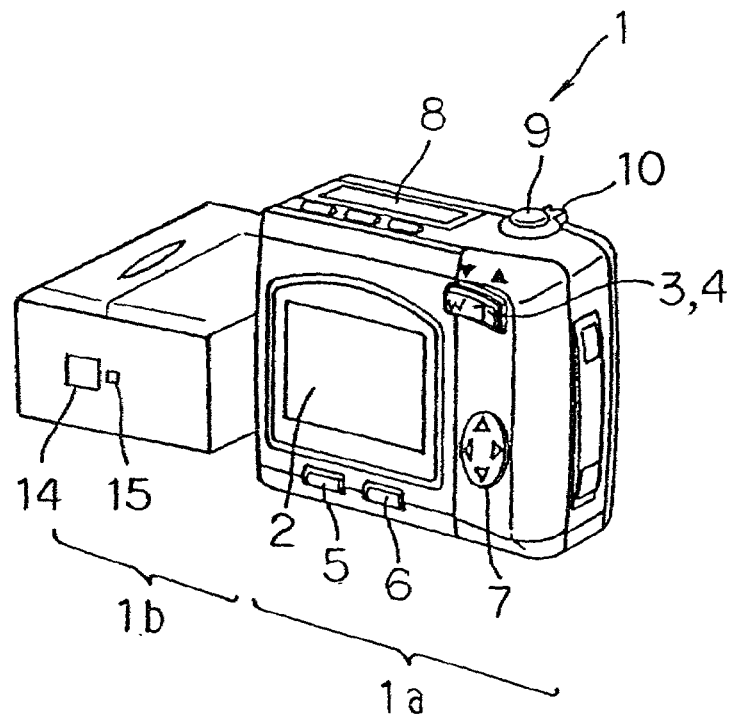
FIG. 2 is a rear exterior view of a camera of an embodiment when in use.
Figure 3:
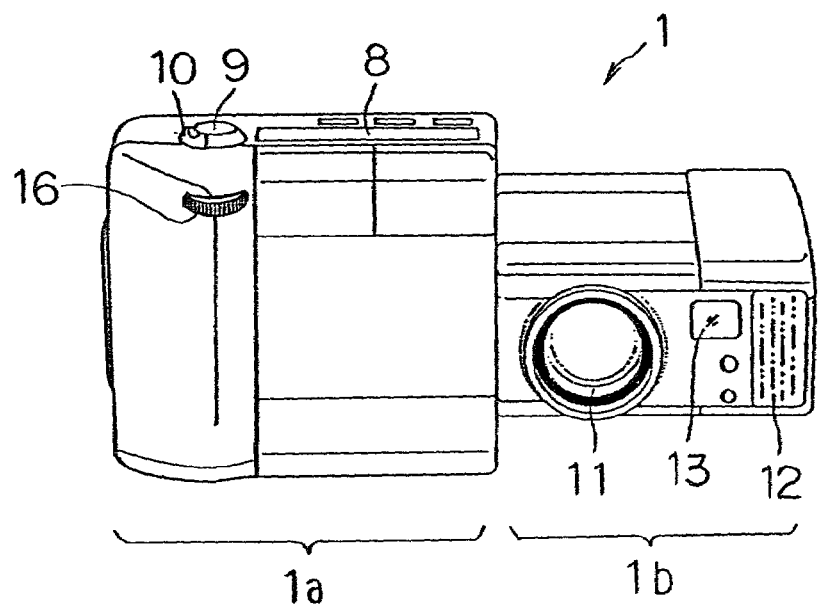
FIG. 3 is a front exterior view of a camera of an embodiment when in use.

FIG. 1 to FIG. 3 show the exterior views of an electronic still camera of a first embodiment. FIG. 1 is a rear view of the camera of when not in use, FIG. 2 is a rear view of the camera when in use, and FIG. 3 is a front view of the camera when in use.

The electronic still camera 1 of the first embodiment is constituted of a camera main body 1*a* and a lens section 1*b*. As shown in FIG. 2 and FIG. 3, the lens section 1*b* is connected so as to be capable of rotating to about 90 degrees with respect to the camera main body 1*a*. At the time of photography, as shown in FIG. 2 and FIG. 3, actual photography is carried out with the lens section 1*b* rotated 90 degrees.

In FIG. 1, a monitor 2, a zoom down (W) button 3, a zoom up (T) button 4, a menu button 5, a monitor button 6 and an area selector 7, etc., are provided on the rear surface of the camera 1.

The monitor 2 is a liquid crystal display that displays a photographed image. It is possible to take a picture while looking at a subject image displayed on the monitor 2, the monitor 2 functions as a viewfinder. The zoom down (W) button 3 is an operation member for causing the zoom lens 11 to change its magnification towards a wide angle side (wide side), while the zoom up (T) button 4 is an operation member for causing the zoom lens 11 to change its magnification to a telephoto side (tele side). As well as zooming the zoom lens 11, the zoom buttons 3 and 4 can also be used to move a cursor (Δ, ∇) on a menu screen displayed on the monitor 2, and to change between each of the modes, etc.

The menu button 5 is an operation member for causing display of a menu screen on the monitor 2. If the menu button 5 is operated when setting to a manual shooting mode M-REC, regular shooting mode menus, such as a focal point adjustment mode, photometry method, electronic zoom shooting mode, pseudo wide shooting mode, pseudo panorama shooting mode, etc., are displayed on the monitor 2. Image processing menus, such as sensitivity conversion, gradation correction, edge emphasis, or white balance adjustment, and special continuous shooting mode menus, such as motion-picture, multiple continuous photography, fixed exposure, BSS etc. are also displayed. Any one of these modes can be selected by moving a cursor with the zoom buttons 3 and 4. If the menu button 5 is operated when setting a playback mode PLAY, playback menus such as thumbnail images, recorded image delete, slideshow etc. are displayed on the monitor 2. Any menu can be selected by moving a cursor with the zoom buttons 3 and 4.

The monitor button 6 is an operation member for switching between illumination of the liquid crystal display monitor 2 with all information on which the subject image and all photographic information such as a number of frames and exposure value, etc. are displayed, illumination of the monitor 2 with minimal information, that displays the subject image and the minimum photographic information, and turning-off. The area selector 7 is an operation member for the photographer to manually select an arbitrary region among a plurality of focal point selection regions set within the photographic field.

An LCD 8, a shutter release button 9 and a select lever 10 etc. are provided on the upper surface of the camera main body 1. The LCD 8 is a display panel for display of information required for taking a photograph, such as continuous photography mode, picture quality mode, remaining battery power, number of photographs, etc. The select lever 10 is an operation member for switching between an automatic shooting mode A-REC, a manual shooting mode M-REC, and a playback mode PLAY. If the select lever 10 is moved from the OFF position to the A-REC position or the M-REC position, power is supplied to the camera 1 and operation in automatic or manual shooting mode commences. If the select lever 10 is moved from the OFF position to the PLAY position, power is supplied to the camera 1 and operation in playback mode commences.

As shown in FIG. 3, a zoom lens 11, strobe flash window 12 and viewfinder window 13 etc., are provided on the front surface of the lens section 1*b*. With this embodiment, description will be given of an example of an electronic still camera with a zoom lens, but it goes without saying that the present invention can also be applied to an electronic still camera with a single focus lens.

As shown in FIG. 2, an eyepiece 14 and an eye approach detection sensor 15 etc., are provided on the rear surface of the lens section 1*b*. This electronic still camera 1 is provided with an optical viewfinder (not shown in the figures) and it is possible to take photographs while looking through the eyepiece 14. The eye approach detection sensor 15 is a sensor for detecting that the photographer is looking through the eyepiece 14, and can be a heat-wave type or acoustic sensor or the like.

As shown in FIG. 3, a command dial 16 is provided on the front surface of the camera main body 1*a*. The command dial 16 is an operation member for performing setting of exposure value, exposure correction value, number of photographs, date and time, etc.

Figure 4:
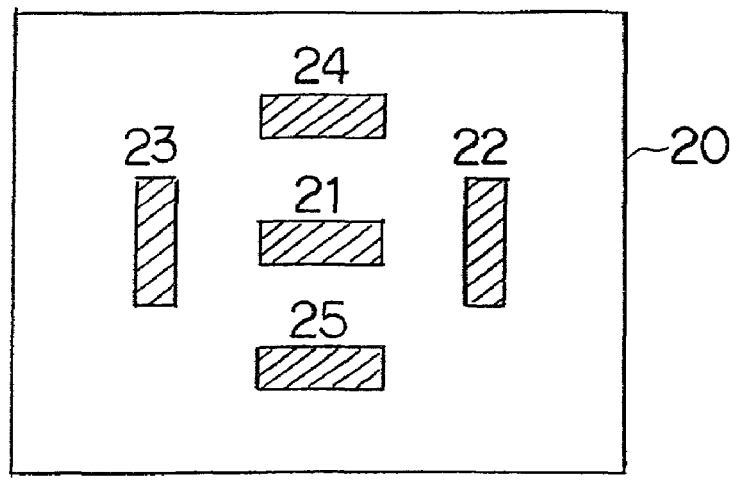
FIG. 4 is a figure showing the arrangement of focal point detection regions within a photographic field.
Figure 5:
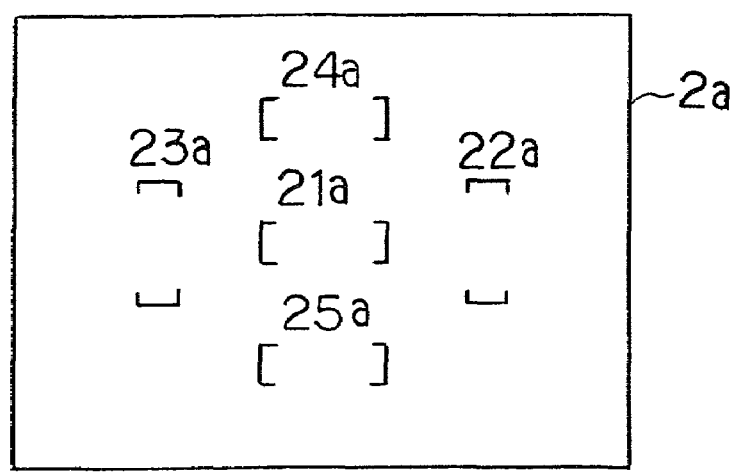
FIG. 5 is a figure showing area marks displayed on a monitor screen.

This electronic still camera 1, as shown in FIG. 4, has a total of 5 focal point detection regions 21 to 25, in the center of the photographic field 20, to the left and right of the screen, and to the top and bottom of the screen. As shown in FIG. 5, area marks 21*a* to 25*a* are displayed superimposed on the subject image on the monitor screen 2*a* in correspondence with each of the focal point detection regions 21 to 25 of the photographic field 20. The number and arrangement of focal point detection regions are not limited to that in this embodiment.

In this electronic still camera 1, in order to reduce cost and installation space there is no display device for displaying area marks corresponding to the focal point detection regions 21–25 superimposed on the subject image inside the optical viewfinder.

Figure 6:
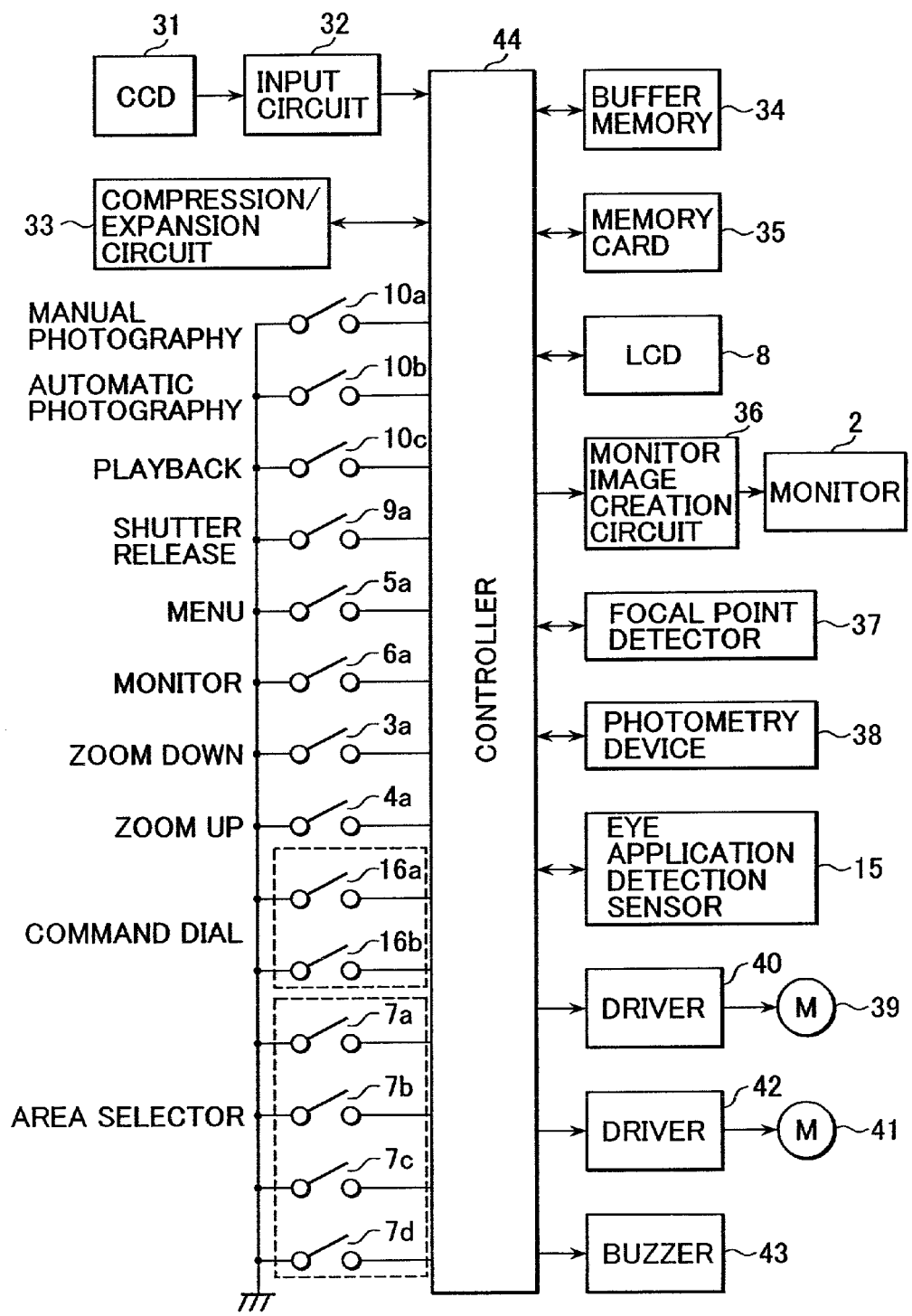
FIG. 6 is a figure showing a control system of a camera of an embodiment.

FIG. 6 is a figure showing a control system of a camera of the first embodiment. The description of the device having the same reference numerals and described in FIG. 1 to FIG. 3 will be omitted.

A CCD 31 is an element for capturing an image of a subject formed using the zoom lens 11, and outputs an analog signal corresponding to the brightness of the subject image for every pixel. An input circuit 32 performs processing such as image sensitivity conversion (gain adjustment) corresponding to the analog pixel signals from the CCD 31, then performs image processing such as recording size conversion by A/D conversion, gradation correction (gamma correction), edge emphasis, white balance adjustment etc., and outputs the result as an original image data. A compression/expansion circuit 33 compresses the original image data according to a set compression rate, and expands the compressed image data to original image data again.

With this embodiment, in addition to recording sizes of full size, VGA size and XGA size etc., there are also provided with shooting modes for trimming a part of the imaged picture to create a recorded image, such as an electronic zoom shooting mode, a pseudo wide shooting mode and a pseudo panorama shooting mode. The image is trimmed by the input circuit 32 according to a set shooting mode.

With this embodiment, description will be given for examples of three types of image quality mode, namely a fine mode (compression ratio of about 1/4), a normal mode (compression ratio of about 1/8), and a basic mode (compression ratio of about 1/16). These image quality modes are sequentially cycled through with each operation of the image quality mode switch (not shown). The type of image quality mode is not limited to those in this embodiment.

A buffer memory 34 is a memory for temporarily storing original image data after taking a picture and compressed image data after compression, and uses SRAM, VRAM or SDRAM, etc. A memory card 35 is a removable recording medium, and can be, for example, flash memory. A monitor image creation circuit 36 creates an image for display on the monitor 2. When setting a manual or automatic shooting mode, image data for display are created from original image data imaged by the CCD 31, and the image is displayed on the monitor 2. When setting a playback mode, image data for display are created by expanding compressed image data read out from the memory card 35, by the compression/expansion circuit 33, and the image is displayed on the monitor 2.

A focal point detector 37 is an image contrast detection type or a phase difference detection type focal point detector, and detects focal point adjustment states for the zoom lens 11, in each of the focal point adjustment regions 21 to 25 inside the imaged picture 20. A photometric device 38 sets a plurality of photometric regions (not shown in the figures) inside the imaged picture 20 and measures luminance for each photometric region, and can perform multiple photometry, center-weighted light reading and spot photometry, etc.

A zooming motor 39 drives a zooming lens (not shown in the figures) of the zoom lens 11 to perform zooming, and is driven by a driver 40. A focussing motor 41 drives a focussing lens (not shown in the figures) of the zoom lens 11 to perform focussing (focal point adjustment) and is driven by a driver 42. A buzzer 43 is used for warning signals.

A controller 44 comprises a microcomputer and various peripheral devices, and executes various computations and sequence control for the electronic still camera. The above described circuits and devices, as well as various switches described in the following, are connected to the controller 44.

A manual shooting mode (M-REC) switch 10*a* linked to the select lever 10 so as to be turned on and off An automatic shooting mode (A-REC) switch 10*b* and a playback mode (PLAY) switch 10*c*

A shutter release switch 9*a* linked to the shutter release button 9 so as to be turned on and off A menu switch 5*a* linked to the menu button 5 so as to be turned on and off A monitor switch 6*a* linked to the monitor button 6 so as to be turned on and off A zoom down switch 3*a* linked to the zoom down button 3 so as to be turned on and off A zoom up switch 4*a* linked to the zoom up button 4 so as to be turned on and off Command dial switches 16*a* and 16*b* turned on and off in response to direction of rotation and amount of rotation of the command dial 16

Area selector switches 7*a* to 7*d* turned on and off in response to direction of operation of the area selector 7.

This electronic still camera is provided with three focus modes, namely an automatic region selection focal point adjustment mode, a manual region selection focal point adjustment mode, and an OFF mode (center fixed focal point adjustment mode), and any of these modes can be selected from the menu screen. With the automatic shooting mode A-REC, the automatic region selection focal point adjustment mode or the OFF mode are fixed, while with the manual shooting mode M-REC it is possible to select any mode from among the above described three types of focal point adjustment mode.

In the automatic region selection focal point adjustment mode, the focussing lens is driven based on focal point detection results for a region selected among focal point detection results detected in each of the five focal point detection regions 21 to 25 inside the photographic field shown in FIG. 4. For example, the controller 44 automatically selects a region having the maximum contrast, or a region where the closest focal point detection result is obtained. The final lens driving amount may be calculated using a predetermined algorithm, based on the focal point detection results obtained in the five focal point detection regions 21 to 25, and the focussing lens is then driven. An automatic focal point adjustment algorithm based on focal point detection results of the plurality of focal point detection regions is disclosed in many published documents, and since that aspect does not relate directly to the present invention a detailed description is omitted.

The monitor image creation circuit 36 lights up only area marks corresponding to the automatically selected focal point detection region (21*a* to 25*a*: refer to FIG. 5) in red, and displays them superimposed on the subject image on the monitor 2. In the event that it is not possible to specify a focal point detection region for carrying out focal point adjustment, the off mode is automatically switched to.

On the other hand, in manual region selection focal point adjustment mode, the focussing lens is driven based on focal point detection results for a focal point detection region selected by the photographer among the five focal point detection regions 21 to 25 using the area selector 7. The monitor image creation circuit 36 lights up area marks corresponding to the manually selected focal point detection region (21*a* to 25*a*) in red, and also lights area marks corresponding to unselected regions in white, and displays these marks superimposed on the subject image on the monitor 2.

In OFF mode, focal point detection is carried out in the focal point detection region 21 in the middle of the photographic field 20, and the focussing lens is driven based on that focal point detection result. The monitor image creation circuit 36 lights up only the area marks 21*a* corresponding to the focal point detection region in the middle of the field, and displays it superimposed on the subject image on the monitor 2.

This electronic still camera 1 is provided with the above described electronic zoom shooting mode, and a pseudo wide shooting mode with an aspect ration of 3:2. The menu button 5 is operated to display a shooting menu screen on the monitor 2, and any shooting mode can be selected using the zoom buttons 3 and 4. The electronic zoom shooting mode and the pseudo wide shooting mode can only be selected when setting to the manual shooting mode M-REC.

Figure 7:
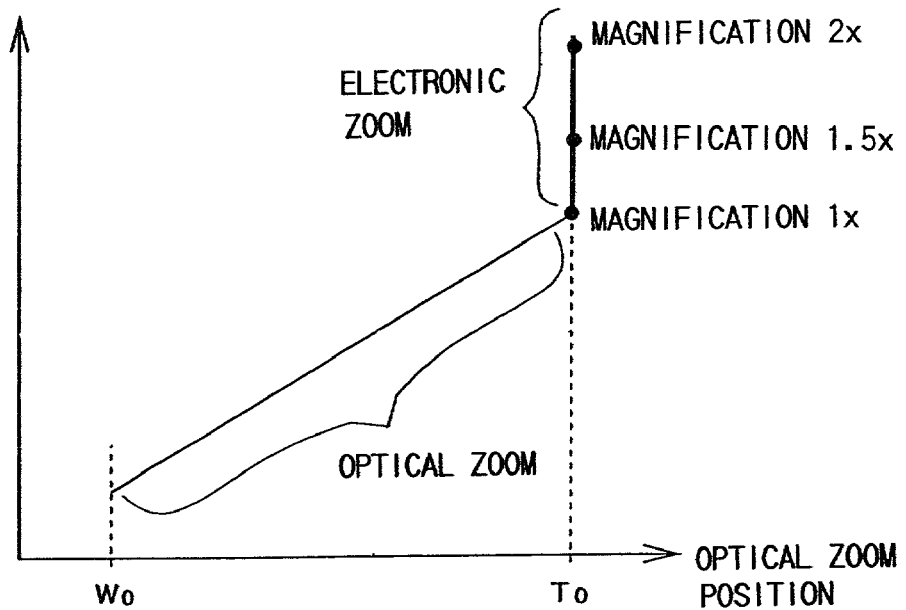
FIG. 7 is a figure showing the relationship between optical zoom position with respect to an optical zoom and an electronic zoom, and the focal length.

FIG. 7 shows the focal length f of the zoom lens 11 using an optical zoom and an electronic zoom. With an optical zoom where focal length is changed by driving the zoom lens 11, if the zoom lens 11 is driven from a wide angle end (wide end) Wo to a telephoto end (tele end) To, the focal length of the zoom lens 11 is increased. If the zoom up button 4 is kept operating for longer than a specified time, for example 2 seconds, after the optical zoom position has reached the telephoto end (tele end) To, pseudo zooming is performed by the electronic zoom, and the focal length is increased in a pseudo manner with the optical zoom position maintained constant.

Figure 8:
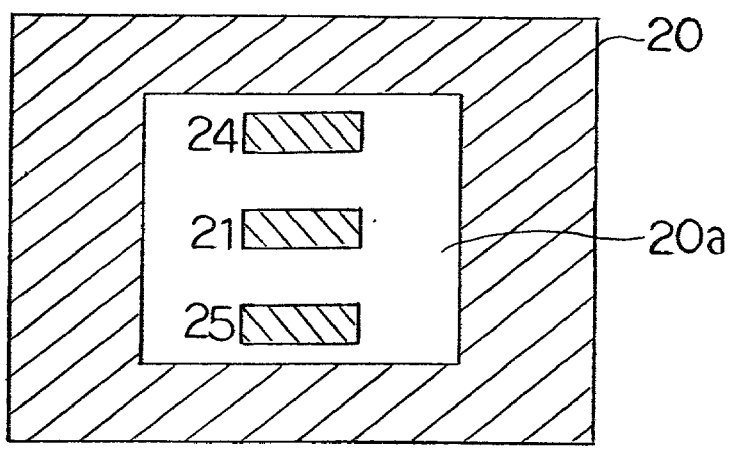
FIG. 8 is a figure showing a trimming range in electronic zoom shooting mode, and focal point detection regions that can be selected.

When taking a photograph in electronic zoom shooting mode, as shown in FIG. 8, an imaged picture captured in the trimming range 20*a* in the middle of the photographic field 20 is enlarged according to the electronic zoom magnification, and a pseudo zoomed up image that is substantially the same as an image taken using a zoom lens is created.

In this electronic zoom shooting mode, if the electronic zoom magnification becomes large, the focal point detection regions 22 to 25 at the edges of the photographic field become outside the trimming range 20*a* of the middle of the field, and so it is necessary to change the focal point detection regions when taking a photograph using electronic zoom. Specifically, it is necessary to add a limitation to the focal point detection regions that can be selected, or to change the positions of the focal point detection regions. With the example shown in FIG. 8, the focal point detection regions 22 and 23 on the left and right of the field have been out of the trimming range 20*a*.

In this embodiment, when the electronic zoom shooting mode has been set focal point detection is only carried out using the middle focal point detection region 21 among the 5 focal point detection regions 21 to 25 inside the photographic field, and focal point adjustment for the zoom lens 11 is carried out according to this focal point detection result. With this embodiment, in other words, when setting the electronic zoom shooting mode, the focal point detection regions that can be selected are limited to only the region 21 in the middle of the photographic field.

Figure 9:
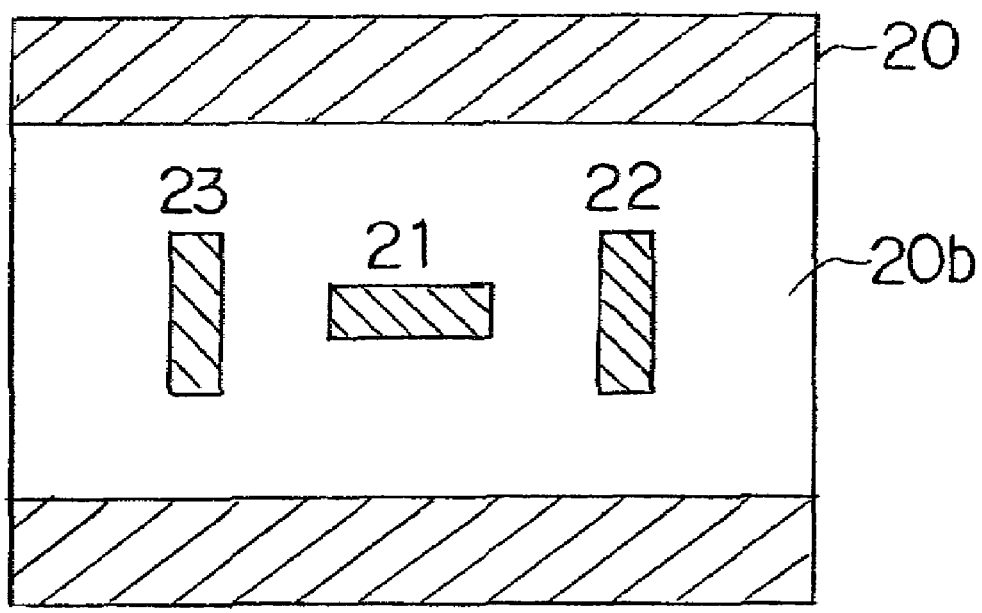
FIG. 9 is a figure showing a trimming range in a pseudo wide shooting mode, and focal point detection regions that can be selected.

On the other hand, when taking a photograph in the pseudo wide shooting mode with the aspect ration of 3:2, as shown in FIG. 9, a wide range 20*b* having the upper and lower parts of the photographic field 20 removed is picked out, and a pseudo wide image is created. At this time, since the focal point detection regions 24 and 25 at the top and bottom of the screen become outside the trimming range 20*b*, it is necessary to change the focal point detection regions in the pseudo wide shooting mode. Specifically, it is necessary to limit the focal point detection regions that can be selected to only the regions in the middle or on the left and right of the photographic field, or to change the positions of the focal point detection regions 24 and 25 at the top and bottom of the field.

In this embodiment, when the pseudo wide shooting mode has been set, as shown in FIG. 9, the only focal point detection regions that can be selected are the focal point selection regions 21, 22 and 23 in the middle of the photographic field and to the left and right of the field.

Figure 10:
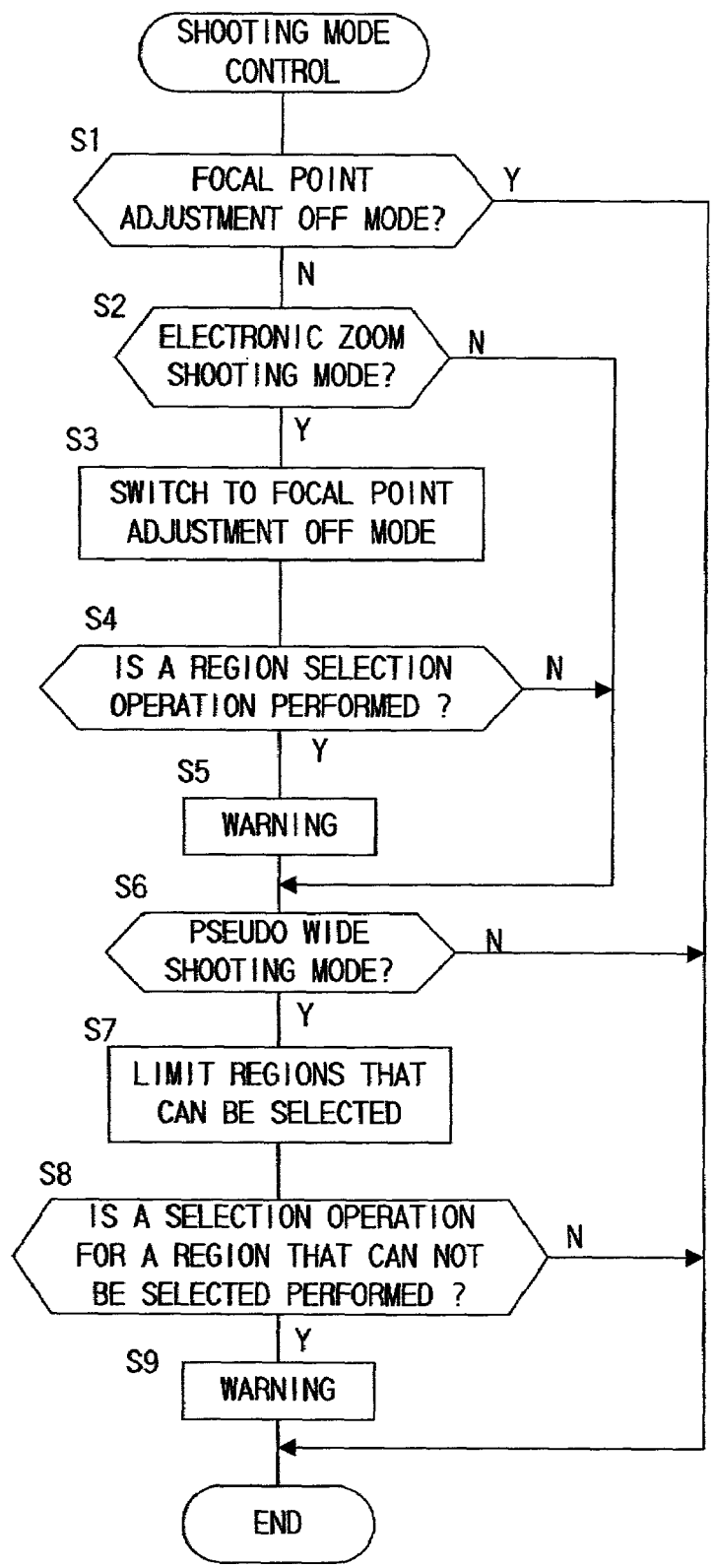
FIG. 10 is a flowchart showing shooting mode control for a camera of a first embodiment.

FIG. 10 is a flowchart showing shooting mode control for a camera of a first embodiment. Shooting mode control of the embodiment will now be described using this flowchart.

A microcomputer of the controller 44 executes a control program when the select lever 10 is set to the manual shooting mode M-REC.

In step 1, it is confirmed whether or not the focal point adjustment mode has been set to OFF mode. When the OFF mode has been set, focal point detection is carried out using only the focal point detection region 21 in the middle of the photographic field, and focal point adjustment is carried out for the zoom lens 11 according to that focal point detection result. Accordingly, even when the electronic zoom shooting mode or the pseudo wide shooting mode have been set, execution of this control program is completed without the need to restrict the use of focal point detection regions or to change the position and size of the focal point detection regions.

When the focal point adjustment mode has been set to the automatic mode or the manual mode, any focal point detection region is automatically or manually selected among the five focal point detection regions 21 to 25 inside the photographic field 20. Accordingly, if the electronic zoom shooting mode or the pseudo wide shooting mode have been set, the focal point detection regions 22 to 25 at the edge of the field become outside the trimming range, and the focal point detection regions are changed according to the trimming range. In step 2 it is confirmed whether or not the electronic zoom shooting mode has been set, and when the electronic zoom shooting mode has been set processing advances to step 3, while otherwise processing advances to step 6.

If the electronic zoom shooting mode has been set, the focal point adjustment mode is set to the OFF mode in step 3. In the OFF mode, focal point detection is carried out using only the focal point detection region 21 in the middle of the photographic field, among the five focal point detection regions 21 to 25 inside the field, and focal point adjustment is carried out for the zoom lens 11 according to that focal point detection result. Specifically, when the electronic zoom shooting mode is set, the focal point detection regions that can be selected are limited to only the region 21 in the middle of the field.

Figure 11:
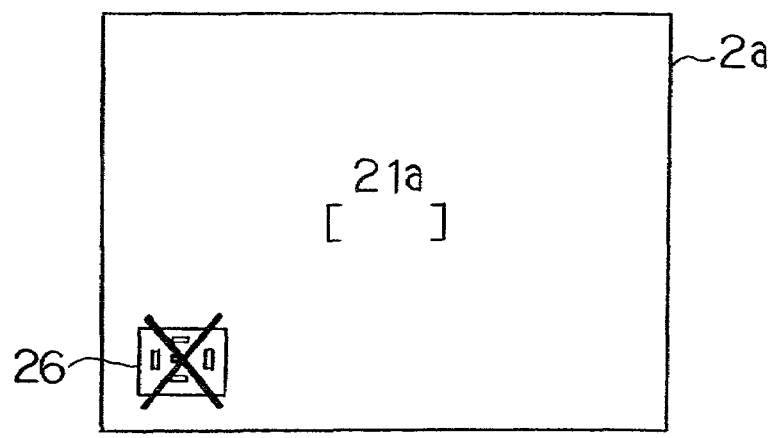
FIG. 11 is a figure showing an example of lighting display of a mark that is lit up and displayed, for prohibiting manual selection of focal point detection regions, on a monitor screen.

Next, if it is judged in step 4 that an operation for changing a focal point detection region has been performed using the area selector 7, even though the focal point adjustment mode has been switched to the OFF mode with the setting to the electronic zoom shooting mode, processing advances to step 5 and a buzzer 43 is sounded to issue a warning. At this time, if the monitor 2 is not turned off, then as shown in FIG. 11 an area mark 21a in the middle of the photographic field and a mark 26 of prohibiting manual selection of focal point detection regions is lit up by the monitor image creation circuit 36 and displayed superimposed on the subject image on the monitor 2.

On the other hand, if the electronic zoom shooting mode has not been set, processing proceeds to step 6 and it is confirmed whether or not the pseudo wide shooting mode has been set. When the pseudo wide shooting mode has been set, processing proceeds to step 7 while otherwise execution of this control program terminates.

If the pseudo wide shooting mode has been set, the focal point detection regions are changed in step 7 according to the trimming range 20b. That is, as shown in FIG. 9, the focal point detection regions 24 and 25 at the top and bottom of the photographic field that are outside the trimming range 20b are made unselectable, and the focal point detection regions 21 to 23 in the middle of the field and to the right and left of the field are made selectable.

If it is judged in step 8 that a selecting operation has been performed for either of the focal point detection regions 24 or 25 at the top and bottom of the photographic field using the area selector 7, even though they have been made unselectable, processing advances to step 9 and the buzzer 43 is sounded to issue a warning. At this time, when the monitor 2 is lit up, a mark warning that an unselectable region is being selected is lit up, as shown in FIG. 11, and displayed superimposed on the subject image. In the automatic region selection focal point adjustment mode, focal point adjustment is carried out automatically using only the focal point detection regions 21 to 23 in the middle and to the left and right of the field, inside the trimming range 20b.

In this way, with the camera of the first embodiment, when the electronic zoom shooting mode has been set focal point adjustment is carried out using only the focal point detection region 21 in the middle of the photographic field, and when the pseudo wide shooting mode has been set focal point adjustment is carried out using only the focal point detection regions 21 to 23 inside the trimming range 20b. For that reason, in the manual shooting mode, even if the photographer inadvertently operates to select a focal point detection region that has been out of the trimming range, this region is not actually selected and it is possible to obtain an image focused on the intended subject inside the trimming range. In the automatic region selection focal point adjustment mode, since focal point adjustment is carried out automatically using focal point detection regions inside the trimming range, it is possible to reliably focus on a main subject inside the trimming range.

First Modified Example of First Embodiment

With the above described first embodiment, when the electronic zoom shooting mode has been set, only the focal point detection region 21 in the middle of the photographic field is made selectable, and when the pseudo wide shooting mode has been selected only the focal point detection regions 21 to 23 in the middle and to the left and right of the field inside the trimming range 20b are made selectable. However, as described in the following, it is possible to alter the position and size of the focal point detection regions in line with the trimming range of respective shooting modes.

As shown in FIG. 7, when the electronic zoom shooting mode is set and the zoom lens 11 is at the telephoto end (tele end) To, if the zoom button 4 is kept operating for longer than a specified period the focal point length is increased in a pseudo manner while the optical zoom position remains at the telephoto end To, and the electronic zoom magnification is increased.

With this modified example, if the electronic zoom magnification, when the optical zoom has reached at the telephoto end, is taken as 1x, the electronic zoom magnification is varied either in steps, such as 1.5×, 2×or continuously, in response to the length of time that the zoom up button 4 is operated after switching from optical zoom to electronic zoom by operation of the zoom up button 4. The electronic zoom magnification at the time the zoom up button 4 has been disengaged is then automatically set and stored in memory (not shown in the figures). It is also possible for the electronic zoom magnification to have only a single value, for example 2×.

Figure 12:
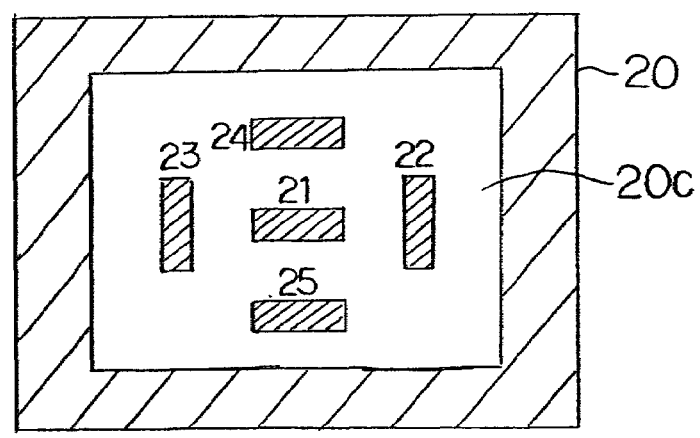
FIG. 12 is a figure showing an example of focal point detection regions of which the size and position are changed in response to an electronic zoom magnification.
Figure 13:
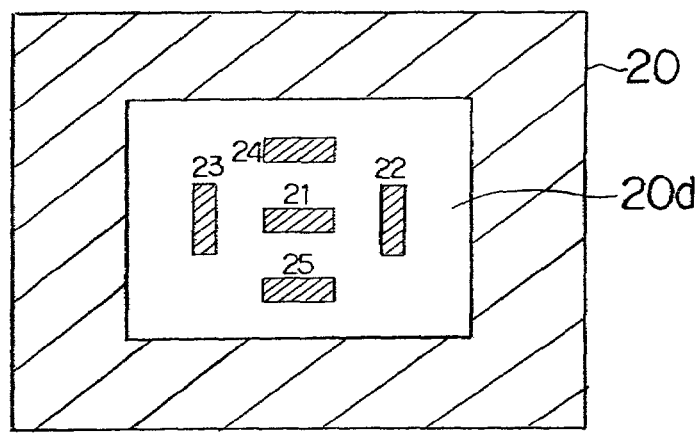
FIG. 13 is a figure showing an example of focal point detection regions of which the size and position are changed in response to an electronic zoom magnification.

When the electronic zoom shooting mode has been set, the positions of the focal point detection regions are changed according to the electronic zoom magnification. For example, with a relationship shown in FIG. 4 between the photographic field 20 and the respective focal point detection regions 21 to 25 at the time the electronic zoom lens 11 is at the telephoto end as a reference, if the electronic zoom magnification becomes large, as shown in FIG. 12, the position and size of each of the focal point detection regions is varied so that the relationship between the trimming range 20c and the respective focal point detection regions 21 to 25 becomes analogous to the reference relationship shown in FIG. 4. Also, if the electronic zoom magnification becomes even larger, as shown in FIG. 13, the position and size of the focal point detection regions is varied so that the relationship between the trimming range 20d and the focal point detection regions 21 to 25 is analogous to the reference relationship shown in FIG. 4.

It is also possible to keep the size of the focal point detection regions 21 to 25 at the reference size shown in FIG. 4, even if the electronic zoom magnification becomes large, and to vary only the position of the focal point detection regions 21 to 25.

Figure 14:
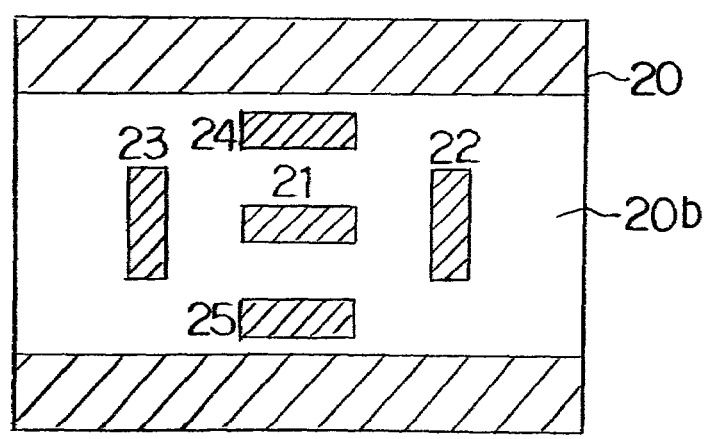
FIG. 14 is a figure showing an example of focal point detection regions of which the size and position are changed in a pseudo wide shooting mode.

On the other hand, when the pseudo wide shooting mode has been set, as shown in FIG. 9, the focal point selection regions 24 and 25 at the top and bottom of the photographic field are outside the trimming range 20b. The position of the focal point selection regions 24 and 25 at the top and bottom of the field are then moved closer to the center of the screen, so that they are placed inside the trimming range 20b, as shown in FIG. 14. As well as changing the position of the focal point detection regions 24 and 25 at the top and bottom of the field at this time, it is also possible to vary the size.

Figure 15:
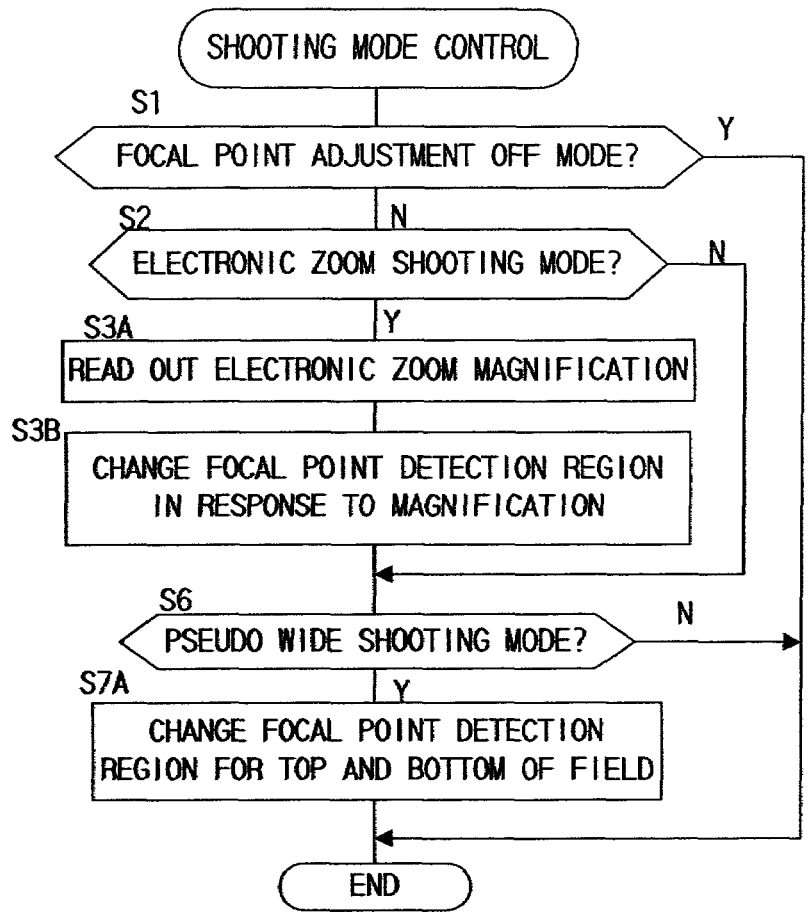
FIG. 15 is a flowchart showing shooting mode control for a camera of first modified example of the first embodiment.

FIG. 15 is a flowchart showing shooting mode control for a camera of the first modified example of the first embodiment. Shooting mode control of the modified example will now be described using this flowchart. Steps that perform the same processing to the processing shown in FIG. 10 have the same step numbers, and description here will center on points of difference.

When the pseudo zoom shooting mode has been set, an electronic zoom magnification is read out from the memory in step 3A, and the focal point detection regions are then changed in step 3B according to the electronic zoom magnification. Specifically, as described above, the position and size of the focal point detection regions is varied so that the relationship between the trimming range and the focal point detection regions 21 to 25 is analogous to the reference relationship shown in FIG. 4.

On the other hand, when the pseudo wide shooting mode has been set, in step 7A the position of the focal point selection regions 24 and 25 at the top and bottom of the screen are moved closer to the center of the screen, so that they are placed inside the trimming range 20b, as described above.

With this modified example, even if the electronic zoom shooting mode or the pseudo wide shooting mode are set, the position and size of the focal point detection regions are varied without removing the focal point detection regions that are outside the trimming range. Accordingly, it is obviously possible to have focal point adjustment using the automatic region selection focal point adjustment mode or the OFF mode, and it is also possible to have focal point adjustment using the manual region selection focal point adjustment mode for manually selecting any focal point detection region inside the photographic field.

In this way, with the camera of the first modified example of the first embodiment, when the electronic zoom shooting mode has been set the positions and size of the focal point detection regions are changed according to that electronic zoom magnification, and when the pseudo wide shooting mode has been set the positions of the focal point detection regions at the top and bottom of the photographic field are moved closer to the center of the field so that they are placed inside the trimming range. Accordingly, even when setting the electronic zoom shooting mode and setting the pseudo wide shooting mode, it is possible to carry out focal point adjustment in the automatic region selection focal point adjustment mode or the manual region selection focal point adjustment mode using a plurality of focal point detection regions set in advance inside the photographic field, with the same sense as when setting normal shooting mode. As a result, it is possible to reliable focus on a main subject present in a wide range of the photographic field or the subject intended by the photographer.

Second Modified Example of First Embodiment

With the above described the first embodiment and the first modified example of the first embodiment, when the electronic zoom shooting mode has been set, only the focal point detection region 21 in the middle of the photographic field is fixed, or the position and size of the focal point detection regions 21 to 25 is varied according to the electronic zoom magnification. However, without varying the position and size of the focal point detection regions 21 to 25 when the zoom lens 11 is at the telephoto end To, it is also possible to restrict the selectable focal point detection regions to only regions inside the trimming range when the electronic zoom magnification becomes large and the trimming range is made to be narrow. A description of this will be given in the following.

Figure 16:
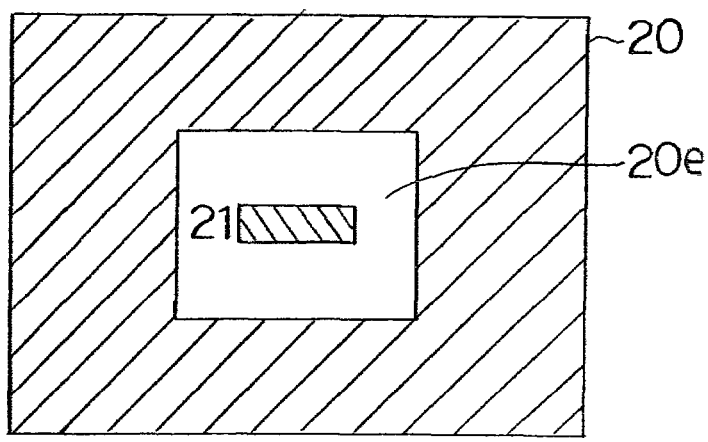
FIG. 16 is a figure showing an example of a focal point detection region that can be selected and is changed in response to an electronic zoom magnification.

For example, when the electronic zoom magnification is small, as shown in FIG. 8 selectable focal point detection regions are restricted to the focal point detection regions 21, 24 and 25 in the middle and at the top and bottom of the photographic field inside the trimming range 20a, and focal point adjustment is carried out using these focal point detection regions 21, 24 and 25. Also, when the electronic zoom magnification is large, as shown in FIG. 16 selectable focal point detection regions are restricted to only the focal point detection regions 21 in the middle of the field inside the trimming range 20e, and focal point adjustment is carried out using this focal point detection region 21.

Figure 17:
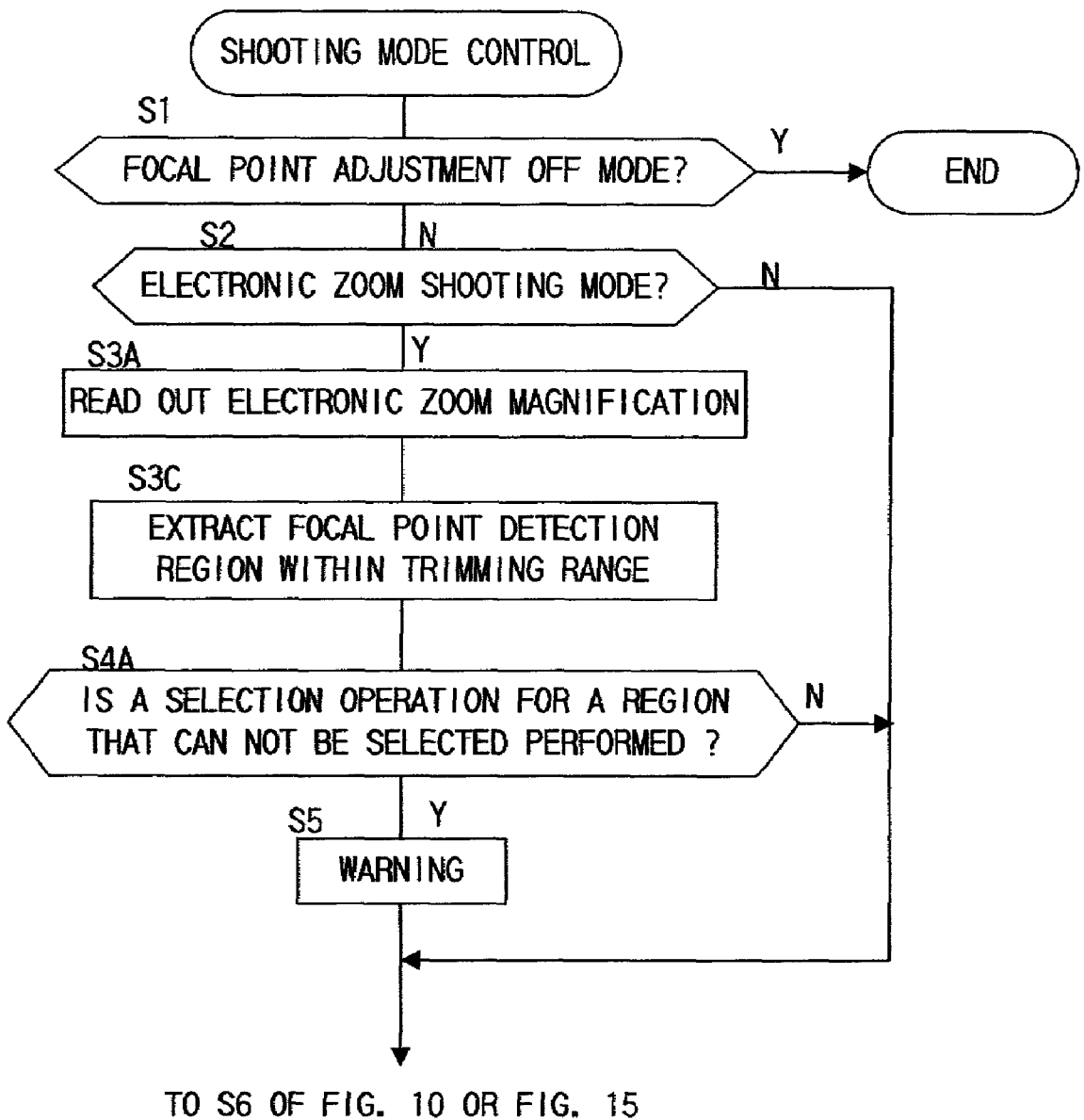
FIG. 17 is a flowchart showing shooting mode control for a camera of second modified example of the first embodiment.

FIG. 17 is a flowchart showing shooting mode control for this second modified example of the first embodiment. Shooting mode control of the modified example will now be described using this flowchart. Steps that perform the same processing to the processing shown in FIG. 10 and FIG. 15 have the same step numbers, and description here will center on points of difference.

When the pseudo zoom shooting mode has been set, an electronic zoom magnification is read out from the memory in step 3A, and processing advances to step 3C. In step 3C, focal point detection regions that are inside the trimming range corresponding to the electronic zoom magnification are extracted from among the five focal point detection regions 21 to 25 inside the photographic field 20, and these regions are made focal point detection regions that can be selected in the automatic region selection focal point adjustment mode or the manual region selection focal point adjustment mode.

Next, if it is judged in step 4A that an operation for selecting a region has been performed using the area selector 7, even though that region is outside the trimming range and has been made unselectable, a warning is issued using the buzzer 43 in step 5. After that, processing advances to step 6 in FIG. 10 or FIG. 15, and the above described processing for the pseudo wide shooting mode is carried out.

In this way, with the camera of the second modified example, when the electronic zoom shooting mode has been set, focal point detection regions, among the plurality of focal point detection regions 21 to 25 set in advance inside the photographic field, that have become outside the trimming range corresponding to the electronic zoom magnification are made unselectable, and focal point adjustment is carried out using only focal point detection regions that are inside the trimming range. Accordingly, in the manual region selection focal point adjustment mode, even if the photographer inadvertently performs a selecting operation for a focal point detection region that has been out of the trimming range, this region is not actually selected and it is possible to obtain an image focused on the intended subject inside the trimming range. In the automatic region selection focal point adjustment mode, since focal point adjustment is carried out automatically using focal point detection regions inside the trimming range, it is possible to reliably focus on a main subject inside the trimming range.

With the above described the first embodiment and the first and second modified examples of that embodiment, description has been given for examples of the electronic zoom shooting mode and the pseudo wide shooting mode, but the present invention can also be applied to a pseudo panorama shooting mode for making the aspect ratio even larger to create a pseudo panoramic image. In this case, similarly to the pseudo wide shooting mode, focal point detection regions that can be selected are limited, or the positions and size of the focal point detection regions are varied, according to the trimming range.

The present invention can also be applied in the case where an arbitrary range is trimmed from any position inside an imaged picture to create an image to be stored in a recording medium. The arbitrary range can be set, for example, by designating any position and size on the monitor. In this case also, focal point detection regions are changed corresponding to a trimming range of the imaged picture. Specifically, for a plurality of focal point detection regions set in advance inside the photographic field, the number, position and size of the focal point detection regions are changed according to the trimming range of the imaged picture. Here, changing the number of focal point detection regions corresponds to limiting the selectable regions among the plurality of focal point detection regions, as described above. When performing this change for the focal point detection regions, it is possible to change the number, position or size independently of each other, or to change the number and position, the number and size, or the position and size or even to change the number, position and size at the same time.

The present invention can also be applied to a camera using silver halide film as the recording medium. For example, in a silver halide film camera capable of changing the aspect ratio of a photographic field for printing, such as by switching between whole field photography and panorama format photography, part of a whole field capable of being photographed is trimmed, and this trimmed range is designated as the photographic field for printing.

Second Embodiment

Figure 18:
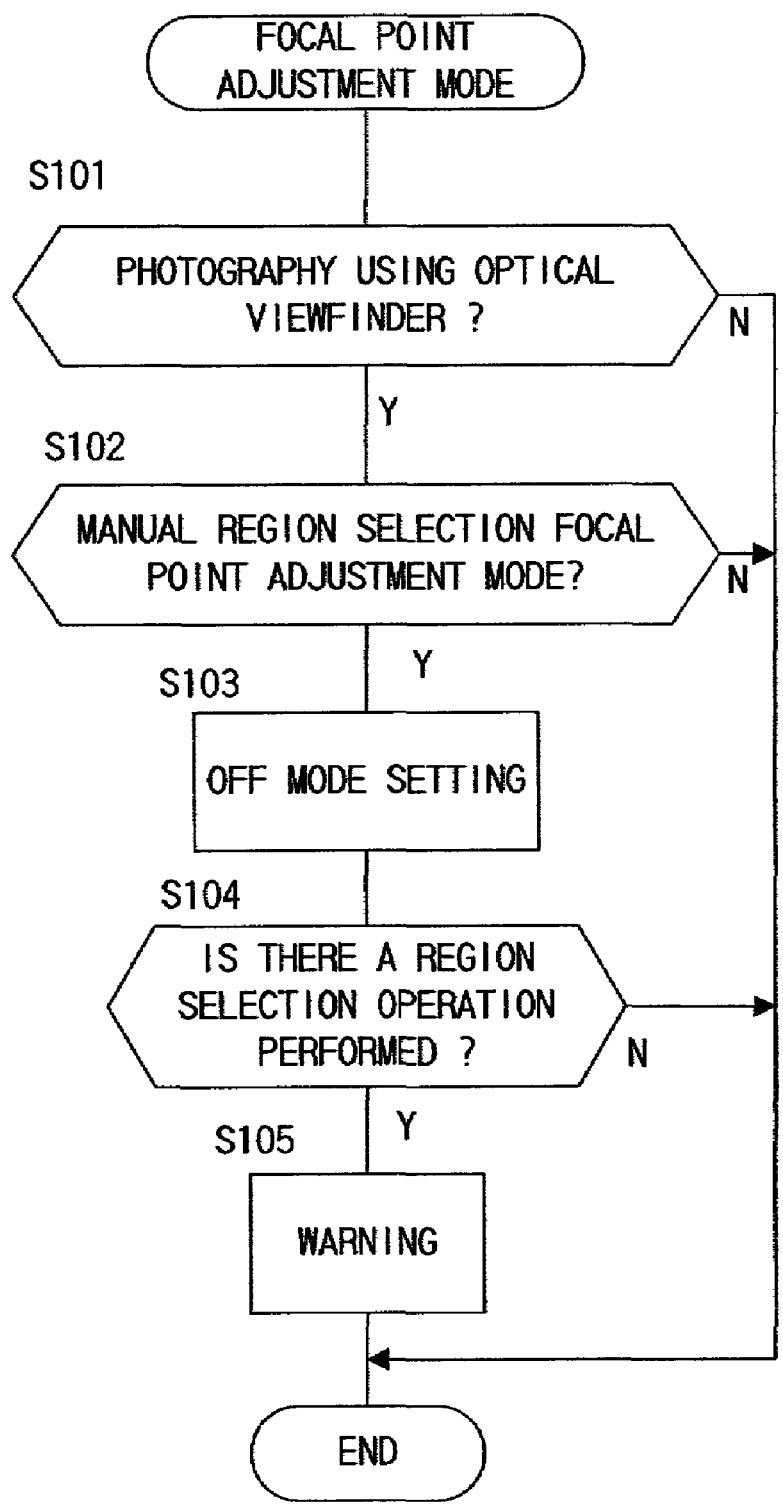
FIG. 18 is a flowchart showing focal point adjustment mode control for a camera of a second embodiment.

FIG. 18 is a flowchart showing a focal point adjustment mode control program for a camera of the second embodiment. With the camera of this second embodiment, it is possible to take photographs while looking at a subject image through an optical viewfinder or on a monitor. When taking a picture with the monitor in a non-use state or using the optical viewfinder, with the camera of the second embodiment focal point adjustment is carried out as described in the following.

A microcomputer of the controller 44 executes a control program when the select lever 10 is set to the automatic shooting mode A-REC or the manual shooting mode M-REC.

In step 101, it is confirmed whether or not a photograph is taken using the optical viewfinder. When the monitor 2 is turned off using the monitor button 6, or when it is detected, by the eye approach detection sensor 15, i.e., a viewfinder sensor, that the photographer is looking through the viewfinder, it is determined that the photographer is taking a picture using the optical viewfinder while looking through the eyepiece or a viewfinder window 14. When taking a picture using the optical viewfinder, processing proceeds to step 102, while otherwise execution of the focal point adjustment mode control terminates.

When taking a picture using the optical viewfinder, in step 102 it is confirmed whether or not the manual region selection focal point adjustment mode has been set. In the manual region selection focal point adjustment mode, an arbitrary focal point detection region is selected using the area selector 7, from among the five focal point detection regions 21 to 25 inside the photographic field 20. If it has been determined that the manual region selection focal point adjustment mode has been set, the OFF mode is switched to in step 103. Specifically, when taking a picture using the optical viewfinder, the manual region selection focal point adjustment mode, for selecting an arbitrary focal point detection region, is prohibited, and the OFF mode is switched to so as to carry out focal point adjustment using only the focal point detection region 21 in the middle of the field.

On the other hand, other than the manual region selection focal point adjustment mode, when the automatic region selection focal point adjustment mode or the OFF mode are set, this focal point adjustment mode control program terminates. Specifically, when the automatic region selection focal point adjustment mode is set, focal point adjustment is carried out using the automatic region selection focal point adjustment mode as it is, and when the OFF mode is set, focal point adjustment is carried using the OFF mode as it is.

If it is determined, in step 104 after switching the manual region selection focal point adjustment mode to the OFF mode, that the area selector 7 has been operated, even though manual selection of focal point detection regions has been prohibited, processing proceeds to step 105 and a warning is issued using the buzzer 43. At this time, if the monitor 2 is not turned off, then as shown in FIG. 11 an area mark 21a in the middle of the photographic field and a mark 26 of prohibiting manual selection of focal point detection regions are lit up and displayed superimposed on the subject image on the monitor 2.

In this way, with the camera of the second embodiment, it is detected that pictures are being taken using the optical viewfinder. When it is detected that a picture is being taken using the optical viewfinder, the manual region selection focal point adjustment mode, for manually selecting an arbitrary focal point detection region from among the plurality of focal point detection regions and carrying out focal point adjustment, is prohibited, and a switch is made to the OFF mode for carrying out focal point adjustment using only the focal point detection region in the middle of the photographic field. Accordingly, even if an area mark indicating which focal point detection region has been manually selected is not displayed in the optical viewfinder, this will not cause any confusion to the photographer when taking photographs using the optical viewfinder. On the other hand, when taking photographs using the monitor, area mark indicating selected region is displayed on the monitor. Accordingly, it is possible to ascertain which region is being selected from among the plurality of focal point detection regions, and it is possible to reliably acquire and focus on a subject intended by the photographer using the manual region selection focal point adjustment mode. As a result, it is possible for an electronic still camera to additionally have a function for performing focal point detection in a plurality of regions inside a photographic field while maintaining a small size and low cost, and it is possible to improve focussing performance with respect to the photographer's intended subject in a small sized, low cost electronic still camera.

An automatic region selection focal point adjustment mode, for calculating a final lens drive amount based on focal point detection results for the plurality of focal point detection regions, is also not prohibited when taking a picture using the optical viewfinder. Therefore, even if a picture is taken using the optical viewfinder with a field angle such that the main subject is positioned outside the center of the screen, it is also possible to reliably focus on the main subject using the automatic region selection focal point adjustment mode.

Modified Example of Second Embodiment

With the camera of the second embodiment described above, when taking a picture using the optical viewfinder, the manual region selection focal point adjustment mode, for selecting an arbitrary focal point detection region, is prohibited, while the automatic region selection focal point adjustment mode is allowed. However, it is also possible to prohibit both the manual region selection focal point adjustment mode and the automatic region selection focal point adjustment mode when taking a picture using the optical viewfinder, and to switch to the OFF mode when these other two modes are set, for carrying out focal point adjustment based on only the focal point detection result for the focal point detection region 21 in the middle of the photographic field.

Figure 19:
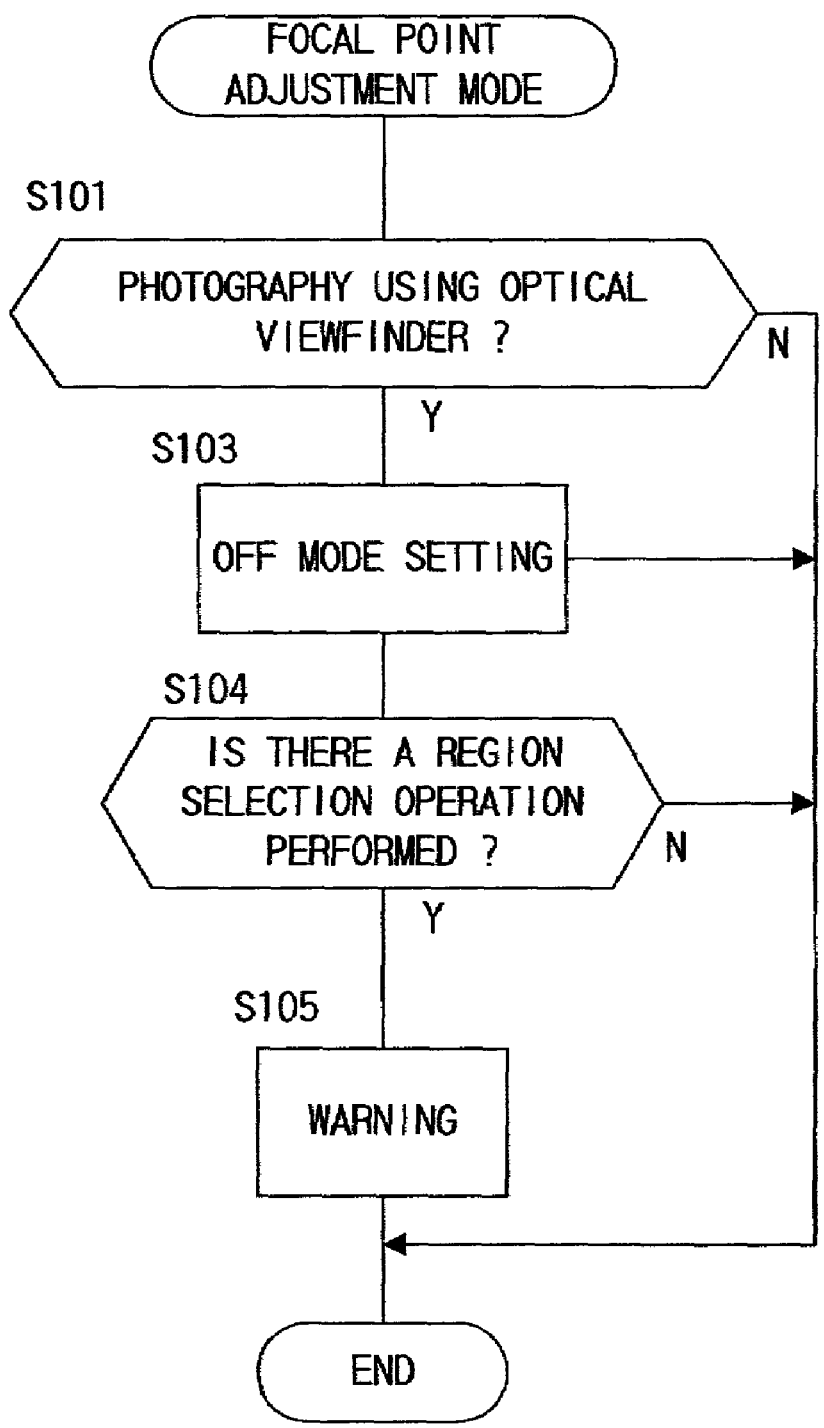
FIG. 19 is a flowchart showing a modified example of focal point adjustment mode control for a camera of the second embodiment.

FIG. 19 is a flowchart showing focal point adjustment mode control for the above described modified example. Steps that perform the same processing as the flowchart shown in FIG. 18 have the same step numbers, and description here will center on points of difference.

When it is detected in step 101 that a picture is being taken using the optical viewfinder, processing proceeds to step 103 and the OFF mode is set. Specifically, when the manual or automatic region selection focal point adjustment mode is set, the OFF mode is switched to, and when OFF mode is set, it is left as it is. As described above, a warning is issued if the area selector 7 is operated even though the manual region selection focal point adjustment mode is prohibited at the time of taking a picture using the optical viewfinder.

In this way, focal point adjustment is carried out using only a focal point adjustment region in the middle of the photographic field when taking a picture using the optical viewfinder. Accordingly, when taking photographs using the optical viewfinder, the means of focal point adjustment is simplified and even if an area mark indicating which focal point detection region has been manually selected is not displayed in the optical viewfinder, this will not cause any confusion to the photographer. Obviously, since area marks indicating selection regions are displayed on the monitor, it is possible to select an arbitrary region from among the plurality of focal point detection regions using the manual region selection focal point adjustment mode, and it is possible to reliably acquire and focus on the photographer's intended subject. As a result, it is possible for an electronic still camera to additionally have a function for performing focal point detection in a plurality of regions inside a photographic field while maintaining a small size and low cost, and it is possible to improve focussing performance with respect to the photographer's intended subject in a small sized, low cost electronic still camera.

What is claimed is:

1. A camera, comprising:
   a focal point detection device that detects a focal point adjustment state of a photographic lens in each focal point detection region of a plurality of focal point detection regions set inside a photographic field;
   an optical viewfinder through which a subject is viewed;
   a monitor that displays a position of each of the focal point detection regions superimposed on a subject image taken using image-capturing elements;
   a region selecting member that manually selects an arbitrary focal point detection region from within the plurality of focal point detection regions; and
   a focal point adjustment device operating in a manual region selection focal point adjustment mode, that carries out focal point adjustment of the photographic lens based on focal point detection results for the focal point detection regions manually selected using said region selection member;
   a sensing section that senses a non-used state of said monitor; and
   a prohibiting section that prohibits manual selection of focal point detection regions by said region selection member when the non-used state of said monitor is detected.

2. The camera according to claim 1, wherein:
   as well as the manual region selection focal point adjustment mode, said focal point adjustment device can also operate in an automatic region selection focal point adjustment mode for carrying out focal point adjustment by automatically selecting any focal point detection region among a plurality of focal point detection regions, and a central fixed focal point adjustment mode for performing focal point adjustment using focal point detection result for focal point detection regions in the center of said photographic field, and
   said prohibiting section prohibits selection of manual region selection focal point adjustment mode when the non-used state of said monitor is detected by said sensing section.

3. The camera according to claim 2, further comprising:
a mode switching section that switches the automatic region selection focal point adjustment mode to the central fixed focal point adjustment mode in the event that the non-used state of said monitor is sensed when the automatic region selection focal point adjustment mode is being selected.

4. The camera according to claim 1, wherein:
a warning is issued in the event that said region selection member is operated when manual selection of the focal point detection region is being prohibited.

5. The camera according to claim 1, wherein:
said sensing section senses the non-used state of said monitor when said monitor is turned off.

6. A camera, comprising:
a focal point detection device that detects a focal point adjustment state of a photographic lens in each focal point detection region of a plurality of focal point detection regions set inside a photographic field;
an optical viewfinder through which a subject is viewed;
a monitor that displays a position of each of the focal point detection regions superimposed on a subject image taken using an image-capturing element;
a region selecting member that manually selects an arbitrary focal point detection region from within the plurality of focal point detection regions;
a focal point adjustment device operating in a manual region selection focal point adjustment mode, that carries out focal point adjustment of the photographic lens based on focal point detection results for the focal point detection regions manually selected using said region selection member;
a sensing section that senses that a photograph is being taken using said optical viewfinder; and
a prohibiting section that prohibits manual selection of focal point detection regions by said region selection member when it is sensed that a photograph is being taken using said optical viewfinder.

7. The camera according to claim 6, wherein:
as well as the manual region selection focal point adjustment mode, said focal point adjustment device also operates in an automatic region selection focal point adjustment mode for carrying out focal point adjustment by automatically selecting any focal point detection region among a plurality of focal point detection regions, and a central fixed focal point adjustment mode for performing focal point adjustment using focal point detection result for a focal point detection region in the center of the photographic field, and
said prohibiting section prohibits selection of manual region selection focal point adjustment mode when said sensing section senses that a photograph is being taken using said optical viewfinder.

8. The camera according to claim 7, further comprising:
a mode switching means that switches the automatic region selection focal point adjustment mode to the central fixed focal point adjustment mode in the event that it is sensed that the photograph is being taken using said optical viewfinder when the automatic region selection focal point adjustment mode is being selected.

9. The camera according to claim 6, wherein:
a warning is issued in the event that said region selection member is operated when manual selection of the focal point detection region is being prohibited.

10. The camera according to claim 6, wherein:
said sensing section determines that the photograph is taken using said optical viewfinder as a result of sensing that a photographer is looking through an eyepiece of said optical viewfinder.

* * * * *